United States Patent Office 3,436,384
Patented Apr. 1, 1969

3,436,384
REACTING NITRIC OXIDE WITH OLEFINS AND PRODUCTS PRODUCED THEREFROM
George H. Crawford, Jr., White Bear Lake, Minn., assignor to Minnesota Mining and Manufacturing Company, St. Paul, Minn., a corporation of Delaware
No Drawing. Filed July 3, 1959, Ser. No. 824,769
Int. Cl. C08f 27/08; C07c 79/12
U.S. Cl. 260—91.1    46 Claims This invention relates to new and useful nitrogen-containing compounds and their derivatives. In one aspect this invention relates to a method for preparing fluorine- and nitrogen-containing compounds useful for producing other compounds, such as polymers. In still another aspect, this invention relates to new and useful fluorine-containing liquids, thermoplastics and elastomers. In still another aspect, this invention relates to new rubbers suitable for coating surfaces and fabrics and having unusual adhesive properties.

There are many fluorine, oxygen and nitrogen-containing carbon compounds in the art. However, few, if any, carbon compounds have combined these elements into a single compound. A combination of fluorine, oxygen and nitrogen in a single compound is a desirable goal since these elements contribute certain specific chemical and physical properties to the ultimate compound, as a result of which combined physical properties the new compounds resulting therefrom have many useful properties and uses. Accordingly, it is the purpose of this invention to provide such new compounds containing nitrogen, oxygen, and fluorine in the same compound and to produce therefrom new and useful derivatives having properties not heretofore found in other compounds of the art.

The object of this invention is to provide a new and useful family of fluorine, oxygen, and nitrogen-containing compounds.

Another object of this invention is to provide processes for the preparation of new fluorine and nitrogen-containing compounds.

Another object of this invention is to provide new liquid compounds which can be cross-linked or vulcanized to form solids.

Still another object of this invention is to provide new thermoplastic and elastomeric compositions.

Another object of this invention is to provide an aqueous latex of high molecular weight nitrogen and fluorine-containing polymer.

Still another object of this invention is to provide a process for polymerizing new nitrogen and fluorine-containing compounds.

Still another object of this invention is to provide new monomers useful in producing polymers therefrom.

Still another object of this invention is to provide new rubbers or elastomers which have good adhesion and good thermal and chemical stability and which can be vulcanized.

Still another object of this invention is to provide new surface coatings.

Various other objects and advantages of the present invention will become apparent to those skilled in the art from the accompanying description and disclosure.

The new family of compounds of this invention are adducts of nitric oxide and a fluorine-containing olefin and polymers thereof. The new fluorine, oxygen, and nitrogen-containing compounds are prepared by reacting nitric oxide with a fluorine-containing olefin to produce an adduct thereof containing a carbon chain of at least two carbon atoms having an oxide of nitrogen group attached to each of two adjacent carbon atoms in said chain in which at least one of said oxide of nitrogen groups is a nitroso group. Preferably, the olefin has at least one halogen atom attached to at least one of the carbon atoms of the double bond and thereby produces an adduct which also contains at least one halogen atom on at least one of said two adjacent carbon atoms. The reaction between the nitric oxide and the olefin is carried out in either the liquid or vapor phase under a wide range of conditions. The temperature of reaction is usually between about 10° C. and about 100° C. Preferably, the reaction is carried out under ambient conditions in the presence of irradiation, such as infrared light. Under such conditions, the reaction is carried out generally in the vapor phase but sufficient pressure may be utilized to cause either or both of the reactants to be present in the reaction zone in the liquid phase without departing from the scope of this invention. The addition reaction can be carried in a batch-type or continuous operation. In a batch-type operation the reaction time is usually between about one and about 30 hours. In a continuous operation, the reactants are continuously charged to the reaction zone, such as a tubular reactor, and the product continuously removed therefrom with a residence time of about 10 seconds to 30 minutes or longer.

The preferred portion of reactants is a mol ratio of nitric oxide to olefin of approximately 2:1 to obtain the adduct. If an excess of olefin is used, such as a mol ratio of 1:1, the reaction may continue and forms a polymer of the adduct with the excess olefin when certain olefins and operating conditions are used.

The oxide of nitrogen-containing compounds of this invention are usually the dinitroso adducts, such as the dinitroso fluoroalkanes, or the nitro nitroso adducts, such as nitro nitroso fluoroalkanes. In some instances, mixtures of the dinitroso- and nitro nitroso compounds may be produced, which mixtures can be separated into their separate components by fractional distillation and other conventional methods. With some olefins and under suitable reaction condtions only the dinitroso adducts are obtained, while with other olefins only the nitro nitroso adducts are obtained. In producing the dinitroso adducts, $R_f(NO)_2$ in which $R_f$ is a fluorine-containing alkyl radical, non-oxidizing conditions should be used, such as excluding substantially all free oxygen from the reaction zone, to minimize or prevent the formation of the nitro group.

A typical structural formula for representing the adducts of this invention is

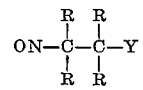

in which R is an alkyl radical or hydrogen or halogen and at least one R is fluorine. Preferably, the R is a halogen, such as fluorine, and/or a perhalogenated or partially halogenated alkyl radical of not more than 5 carbon atoms, and preferably the halogens are fluorine and/or chlorine; and in which Y is an oxide of nitrogen group, such as NO.

The olefin employed in the reaction with the nitric oxide is preferably an acyclic monoolefin-1 containing not more than 12 carbon atoms per molecule, generally not more than 6 carbon atoms, and preferably contains at least one halogen atom attached to at least one of the carbon atoms of the double bond. Preferably, these halogens are normally gaseous halogens. The preferred class of olefins is the perhalogenated olefins in which the halogens are normally gaseous halogens and in which at least one fluorine atom is attached to each of the carbon atoms of the double bond. Examples of such preferred class of olefins are tetrafluoroethylene, trifluorochloroethylene, perfluoropropene and perfluorobutene-1. Those fluorine-containing olefins which are perhalogenated but contain only chlorine on one of the carbon atoms of the double bond are also useful as reactants with the nitric oxide in accordance with this invention. Such olefins include unsymmetrical difluorodichloroethylene, 2-chloropentafluoropropene-1, and 1,1-dichlorotetrafluoropropene-1. Other olefins which may be employed in the present invention are those which are only partially halogenated but contain at least one fluorine atom on one of the carbon atoms of the double bond, and such olefins may include those which contain hydrogen only on one of the carbon atoms of the double bond. Examples of such olefins are vinylidene fluoride, difluoromonochloroethylene, 1,1-chlorofluoroethylene, trifluoroethylene, 1,1-dihydroperfluoropropene-1, and 1,1-dihydroperfluorobutene-1.

Some of the adducts produced by the process of the present invention are dinitroso perfluoroethane, dinitroso trifluorochloroethane, dinitroso perfluoropropane, nitro nitroso perfluoroethane, and nitro nitroso perfluoropropane.

In accordance with the present invention, the adducts above described can be isolated and separated from impurities, such as oxides of nitrogen (NO, $NO_2$, $N_2O_3$), which may function as chain transfer agents during subsequent polymerization, by fractional distillation. Thereafter, the isolated adduct may be copolymerized with unsaturated organic compounds to produce new and useful polymers which vary in physical form from normally liquid to normally solid high molecular weight material depending upon the polymerization conditions and reactants. The low molecular weight liquid and waxy polymers of this invention correspond to a degree of polymerization or telomerization of 2 to 100. The solid copolymers produced in accordance with the present invention have an average molecular weight above 50,000 and generally above 100,000 and as high as 150,000 and 200,000 and higher. The solid copolymer produced by the method of the present invention is either a thermoplastic or elastomeric material. The polymers produced from the nitro nitroso adducts are of linear structure with the nitro group in the alkyl side chain and the nitroso group in the polymer chain. The polymers produced from the dinitroso adducts are not of a linear structure but are cross-linked and are, therefore, three dimensional polymers. Both the elastomeric and thermoplastic copolymers are usually insoluble in conventional hydrocarbon solvents but are soluble in fluorinated hydrocarbons except when produced in cross-linked form.

The comonomers with which the adducts of the present invention are copolymerized are the polymerizable unsaturated organic compounds, preferably having ethylenic unsaturation and not more than about 10 carbon atoms per molecule. More preferably, these are acyclic olefins having at least 2 halogen atoms per molecule, at least 2 of which are fluorine. However, both unsubstituted and substituted unsaturated organic compounds may be employed as the comonomer without departing from the scope of this invention. Examples of substituted unsaturated organic compounds which are useful as the comonomer are the monoolefins containing at least one fluorine atom on at least one carbon atom of the double bond, such as trifluoroethylene, difluoromonochloroethylene, tetrafluoroethylene, trifluorochloroethylene, unsymmetrical difluorodichloroethylene, and perfluoropropene; the fluorine-containing diolefins, such as 1,1-difluorobutadiene-1,3, 1,1,2-trifluorobutadiene-1,3, 1,1,3-trifluorobutadiene-1,3, 1,1-difluoro-2-methylbutadiene-1,3, 1,1-difluoro-3-methylbutadiene-1,3, 1,1-difluoro-2-trifluoromethylbutadiene-1,3, and 1,1,2,4,4-pentafluorobutadiene; and fluorine-containing vinyl ethers, such as 2,2,2-trifluoroethylvinyl ether, methyltrifluorovinyl ether and γ-trifluoromethoxytetrafluoropropylvinyl ether ($CF_3OC_2F_4CH_2OCH=CH_2$); and the fluorine-containing esters, such as the acrylate ester of 1,1-dihydroheptafluorobutanol, methacrylate ester of n-ethylperfluorooctane sulfonamido ethanol, and acrylate ester of n-propylperfluorooctane sulfonamido ethanol. Non-halogenated substituted comonomers which may be used are propyl vinyl ether, acrylonitrile and styrene. An example of a non-substituted olefinically unsaturated comonomer is butadiene.

Since the copolymerization reaction appears to proceed by the free-radical mechanism, various polymerization techniques may be utilized to copolymerize the monomers of the present invention to produce the copolymer product. Accordingly, the polymerization may be carried out as a bulk polymerization in which the monomers are polymerized in a bomb under autogenous pressure at temperatures below 10° C., preferably below 0° C. and as low as −65° C., for a period of time of at least one-half hour to obtain a high conversion to the solid polymer. Elastomers thus produced from this technique are transparent amorphous gums. Temperatures much above 25° C. in the bulk system result in the lower molecular weight waxy or oily product.

It has also been found that polymers can be produced by the use of the aqueous emulsion technique in which the monomers are emulsified in an aqueous medium during polymerization. This technique may be carried out at substantially higher temperatures than the bulk system, and temperatures above 0° C. and as high as 50° C. may be employed and still result in the production of high molecular weight solid polymers. The use of an emulsifier and higher temperatures increases the rate of reaction but does not result in lower molecular weight material. It has been found that the perhalogenated alkanoic acids and salts thereof are particularly good emulsifying agents. For example, the perfluorochloro and the perfluoroalkanoic acids having between about 6 and about 12 carbon atoms per molecule are suitable either in the acid form or in the alkali metal or ammonium salt form. A particularly suitable emulsifier is perfluorooctanoic acid or the potassium salt thereof.

If production of liquids and waxes is desired, higher temperatures up to about 150° C. and chain transfer agents, such as dodecyl mercaptan, carbon tetrachloride and chloroform, are usually used.

The proportion of the oxide of nitrogen-containing compound to the comonomer used for the copolymerization is usually between about 2:1 and about 1:2 mol ratio.

In the case of tetrafluoroethylene (a monomer which is readily homopolymerized), the reaction can be run under such conditions that the adduct is formed and then the adduct copolymerizes in situ with unreacted tetrafluoroethylene by using an excess of the olefin. This technique, being a one-step reaction, has the advantages of simplicity and economy for producing the polymer.

In cases in which the olefin in the reaction is difficult to polymerize, polymerization can be prevented under the conditions suitable for the preparation of the simple adducts, hence the adduct can readily be produced and isolated in the pure state without recourse to techniques designed to avoid in situ copolymerization. Fluoroolefins, such as $CF_3CF=CF_2$, $CF_3CF_2CF=CF_2$, $CF_3CF=CH_2$ and $CF_3CF_2CF=CH_2$, which do not or are difficult to homopolymerize are those comprising the class of the above description. Where the olefin is readily polymerizable with the adduct and there is a tendency to polymerize therewith during the formation of the adduct, the use of stoichiometric quantities of reactants necessary to produce the adduct will minimize concurrent copolymerization. Also the use of low temperatures and mild initiators will also minimize the copolymerization reaction. In the batch-type operation, formation of copolymer during adduct formation may be prevented or minimized by removal of the adduct as formed, such as by condensation and separation thereof from the reaction zone. The use of a continuous reaction system followed by quenching of the product facilitates selectivity of the reaction toward adduct formation alone.

The solid high molecular weight copolymers of the present invention are useful as sealants, adhesives and surface coatings, such as for metal and glass surfaces. The polymers of the present invention can be coated on various surfaces directly from the aqueous latex produced in the aqueous emulsion system or the separated and dried polymers can be dissolved in a fluorocarbon or chlorofluorocarbon solvent, such as the Freons, and then coated on the surface. In the case of using the aqueous latex for coating of a surface, the deposited copolymers after evaporation of the aqueous medium of the latex form a continuous homogeneous nonporous film on the surface with satisfactory adhesion thereto. The copolymers of this invention show unusual adhesive properties on metal and glass surfaces, which is a property not to be expected because of the high fluorine content.

The solid high molecular weight copolymers of this invention may be preformed or fabricated at temperatures above about 150° C. into various articles, such as gaskets and O-rings, and the solid elastomers may be vulcanized to produce stiffer and harder articles. Articles made with the present copolymers can be used under a broad range of temperature conditions, such as a temperature as low as −50° C. and as high as 300° C., depending on the particular copolymer.

Useful vulcanizing or cross-linking agents for the polymers of this invention include the dimercaptans, such as hexamethylene dithiol; and amines, such as hexamethylene diamine, triethylene tetramine, hexamethylene diamine carbamate. Temperatures up to about 150° F. are usually employed for vulcanization. In the case of hexamethylene diamine as a cross-linking agent, room temperature may be used for cross-linking. These vulcanizing or cross-linking agents are used primarily in cross-linking the linear copolymer of the nitro nitroso alkane.

The liquid and waxy copolymers of this invention are useful as lubricants, sealants, chemical intermediates, plasticizers, and insulating and dielectric compositions. The liquid polymers, particularly those made from the nitro nitroso alkane, may also be vulcanized as above into solid material.

The nitroso adducts of this invention are superior solvents and are particularly useful as solvents for the polymers of this invention.

The following examples are offered as a better understanding of the various aspects of this invention and should not be construed as limiting the invention.

EXAMPLE I

Equimolar quantities of NO and $C_2F_4$ were charged into a 12.5 litre 3-necked flask to a pressure totaling one atmosphere or .25 mol each. The vessel was irradiated 16 hours with infrared light. At the end of this period a pressure drop of 0.5 atmosphere was noted. The vessel was repressured with NO and the above procedure repeated. The vessel contained a blue gas. This was forced out of the flask through a series of three water scrubbers by introducing water into the flask. The gas was collected, then fractionated by distillation. The distillation was carried out in a screen-saddle packed column of 10 theoretical plates. To the distillation pot was added an equal volume of water for the absorption or hydrolysis of any remaining impurities. 21 grams of a deep blue liquid boiling 21.5–22.5° C., accounting for 60 weight percent of the starting materials was obtained. The infrared spectrum showed a strong band at 6.25μ corresponding to the —N=O grouping. The compound analyzed 11.9 weight percent carbon. The Dumas molecular weight of the gas averaged 179. Nuclear magnetic resonance determinations and the above analytical information indicated the gas to comprise essentially the nitro nitroso adduct $(ONCF_2CF_2NO_2)$.

EXAMPLE II

Into a 30 ml. Pyrex ampoule was condensed 2.4 grams of the NO adduct to tetrafluoroethylene which was prepared and purified in accordance with Example I. 1.5 grams $C_2F_4$ was likewise admitted to the ampoule. The ampoule was held at −25° C. for eight hours. After the first three hours the contents of the tube had solidified into a gum. The ampoule was opened and the polymer was dissolved with Freon 113 and removed from the ampoule as a solution. Upon removal of solvent, 2.8 grams of a transparent elastomeric gum were obtained. The infrared spectrum still showed the characteristic —NO band. However, its intensity was reduced by an amount indicating consumption in the polymerization reaction. This polymer was found to contain F, 54.3 weight percent, N, 9.8 weight percent, and C, 17.5 weight percent, and had a molecular weight of about 100,000. From the solubility of the gum, the analytical data and molecular weight, the elastomeric gum was thus identified as a copolymer having a linear structural formula of

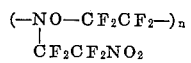

EXAMPLE III

Into a 22 litre Pyrex flask containing 200 grams of mercury agitated by a sealed stirrer were charged ⅔ atmosphere of nitric oxide (NO) and ⅓ atmosphere of tetrafluoroethylene. The mercury was present to absorb any traces of dinitrogen tetroxide that may have been contaminating the nitric oxide and extreme care was taken to assure non-oxidizing conditions. After three days, during which the mercury was continuously agitated, the pressure had drooped to ⅔ atmosphere and the flask contained a blue gas. The gas was pumped out and fractionated in a steel helix packed column. 20 cc. water was added to the pot for the absorption of impurities. Fractions were taken as follows:

|  | Grams |
|---|---|
| Cut 1, 0–10° C. | 5 |
| Cut 2, 10–21° C. | 4 |
| Cut 3, 21–23° C. | ¹ 12 |

¹ Nitro nitroso perfluoroethane.

Into a Pyrex ampoule were condensed 4 grams of the NO adduct of tetrafluoroethylene of Cut 2 above along with 2.5 grams tetrafluoroethylene. The vessel and contents were held at −25° C. for 6 hours, during which time 4.4 grams of a solid polymer formed and the characteristic blue color of the adduct disappeared. The polymer, as contrasted to that obtained with the adduct boiling at 21.5–22.5° C. as in Example II was cross-linked, indicating the presence of the difunctional monomer

in this fraction of the adduct. The polymer was only partially soluble in Freon 113, therefore, indicating a three dimensional cross-linked structure as the result of the two nitroso groups on the monomer adduct.

EXAMPLE IV

The operation of Example I was repeated substituting ultraviolet irradiation for infrared. At the end of 16 hours the pressure had dropped 0.4 atmosphere. The flask contained the previously observed dark blue vapor along with a sizable amount of straw-colored oil. This was fractionated under vacuum with cuts taken representing various levels of polymerization. A waxy cut boiling at 70–100° C. at 5 mm. Hg contained 33 weight percent F and 11 weight percent nitrogen and corresponded to a copolymer, the nitric oxide-tetrafluoroethylene adduct, having a molecular weight of about 10,000.

EXAMPLE V

Into a 30 ml. Pyrex ampoule were condensed 0.6 gram nitric oxide and 1 gram $C_2F_4$, corresponding to a 2:1 mol ratio of nitric oxide to $C_2F_4$. The ampoule and contents were warmed to 23° C. under autogenous pressure. After three hours a pronounced blue color had developed in both the liquid and vapor phases. After 16 hours the blue color had disappeared and a gum had formed in the ampoule (0.8 gram). By elemental analysis, the gum was found to contain 11 weight percent nitrogen. The infrared spectrum showed a strong absorption in 8.0–9.0 region corresponding to $$-\overset{|}{N}-O-$$

The material was identified as a copolymer of $$ONCF_2CF_2-NO$$

EXAMPLE VI

Into a 300 ml. Pyrex ampoule were condensed 4 grams of nitric oxide (NO) and 20 grams perfluoropropene ($C_3F_6$), corresponding to a 1:1 mol ratio of nitric oxide to olefin. After 60 hours at room temperature a dark blue liquid was obtained. A flash distillation separated this into two components, one boiling at −21° C., consisting essentially of unreacted $C_3F_6$. The residual material boiling above room temperature was thoroughly flashed with water to remove any remaining oxides of nitrogen and readily hydrolyzable impurities, such as esters. A deep blue liquid was obtained whose infrared spectrum indicated it to be a nitroso perfluoroalkane. The nuclear magnetic resonance spectrum was complex, indicating a mixture of fluoroalkanes bearing —$NO_2$ groups in addition to the —NO groups. Elemental analysis of 48.3 weight percent F and 15.7 weight percent C corresponded most closely to the stoichiometry of $C_3F_6N_2O_3$. The composition was thus considered a mixture of $$ON-\overset{F}{\underset{CF_3}{C}}-\overset{F}{\underset{F}{C}}-NO_2 \text{ (or the perfluoromethyl isomer)}$$

and $$ON-\overset{F}{\underset{CF_3}{C}}-\overset{F}{\underset{F}{C}}-NO$$

The two nitroso alkanes could be separated by fractional distillation.

EXAMPLE VII

Into a 300 ml. stainless steel autoclave was charged 75 grams $C_3F_6$. Agitation was begun and nitric oxide was introduced to a pressure of 350 p.s.i. gauge at 20° C. After a 30 minute interval the pressure had dropped to 160 p.s.i. gauge. This introduction of NO followed by pressure drop was repeated six times until no further pressure drop occurred. The contents were removed and treated as in Example VI. 20 grams of nitroso-substituted perfluoropropane were obtained corresponding to a mixture of nitro nitroso perfluoropropane and dinitroso perfluoropropane from which the nitroso alkanes could be separated and recovered by fractional distillation.

EXAMPLE VIII

Into a 12.5 litre 3-necked flask were introduced ⅔ atmosphere of NO and ⅓ atmosphere $CF_2=CFCl$. After five days the pressure had dropped to .78 atmosphere and the flask contained a blue gas. The contents of the flask were pumped out and condensed in Dry Ice. 2.1 grams of blue liquid were obtained after water washing to remove oxides of nitrogen and hydrolyzable impurities. This liquid was distilled under vacuum. Its boiling point, corrected to 1 atmosphere, was 64° C. Nuclear magnetic resonance analysis and molecular weight determinations indicated the structure to be $$\underset{NO}{CF_2}-\underset{NO}{CFCl}$$

EXAMPLE IX 5 grams of polymer obtained according to the method of Example II were blended on the micro mill with 0.1 gram hexamethylene diamine. It was found that curing occurred at room temperature in 15 minutes. The elastomeric gum was converted into a rubber with good snap and rebound. The presence of cross links was indicated by the fact that the gum which was normally completely soluble in trifluorotrichloroethane was rendered insoluble in that solvent.

EXAMPLE X

Into a 20 ml. Pyrex ampoule were placed 1 gram of the NO adduct to tetrafluoroethylene ($C_2F_4$) (prepared as in Example I) and 1 gram of $CF_2=CCl_2$. After five days at −25° C. the ampoule was opened and the contents of the tube removed. The product consisted of 1.8 grams of a hard, transparent thermoplastic having a molecular weight of about 50,000.

EXAMPLE XI

Into a 30 ml. Pyrex ampoule containing 10 cc. of a 4 percent aqueous solution of $C_8F_{17}COOK$ buffered with $K_2HPO_4$ was added 2.4 grams of the NO adduct to tetrafluoroethylene (prepared in accordance with Example I) and 1.5 grams of tetrafluoroethylene. After 17 hours agitation at 22° C., the characteristic blue color of the adduct had disappeared and a heavy milky latex was obtained. This was freeze coagulated and worked up by washing in methanol and water. 3.7 grams of elastomeric gum were obtained corresponding to the 1:1 copolymer having a molecular weight above 150,000.

EXAMPLE XII

Into a 30 ml. Pyrex ampoule were charged 2.4 grams of the NO adduct to tetrafluoroethylene (prepared in accordance with Example I) and 1.64 grams trifluorochloroethylene. After standing four hours at −25° C. the reaction mixture had solidified. The vessel was opened and 0.3 gram unreacted adduct was recovered. 3.8 grams of solid polymer was obtained corresponding to a 1:1 copolymer having an average molecular weight of about 100,000 to 150,000.

EXAMPLE XIII

Into a 30 ml. Pyrex ampoule were charged 2.4 grams of the NO adduct to tetrafluoroethylene (prepared as in Example I) and 1.32 grams of trifluoroethylene. After 48 hours at −25° C. the reaction mixture had solidified. A faint bluish color indicated the presence of a trace of unreacted adduct. The solid polymer was dissolved in trifluorotrichloroethane and removed from the vessel. 3.5 grams of rubbery linear copolymer were obtained having an average molecular weight above 50,000.

EXAMPLE XIV

Into a 30 ml. Pyrex ampoule were charged 2.4 grams of the NO adduct to tetrafluoroethylene (prepared as in Example I) and 1.71 grams of $CF_3CH_2-O-CH=CH_2$. After two hours at −25° C. all blue color had disappeared and 3.5 grams of a clear, viscous, polymeric liquid was obtained whose boiling point was above 100° C.

EXAMPLE XV

Into a 30 ml. Pyrex ampoule were charged 2.4 grams of the NO adduct to tetrafluoroethylene (prepared as in Example I) and 1.57 grams of $CF_2=CFCH=CH_2$. The reaction mixture reacted in 15 minutes at −78° C. giving rise to 3.0 grams of a clear polymeric liquid which could be separated into various fractions, the highest of which was an elastomeric gum.

Various modifications and alterations of the conditions of reaction and reactants may become apparent to those skilled in the art from the accompanying description without departing from the scope of this invention.

Having described my invention, I claim:

1. A new halogen-substituted organic compound of the formula:

$$ON-\overset{R}{\underset{R}{C}}-\overset{R}{\underset{R}{C}}-Y$$

in which R is selected from the group consisting of an alkyl radical of not more than 5 carbon atoms, hydrogen, chlorine and fluorine and at least two R's are halogens at least one of which is fluorine, and in which Y is selected from the group consisting of a nitroso radical and a nitro radical.

2. The compound of claim 1 in which Y is a nitroso radical.

3. The compound of claim 1 in which Y is a nitro radical.

4. An adduct of nitric oxide and an acyclic monoolefin-1 containing not more than 12 carbon atoms per molecule and having at least two halogen atoms selected from the group consisting of chlorine and fluorine attached to the doubly bonded carbon atoms at least one of which is fluorine, containing two oxide of nitrogen groups selected from the members consisting of a nitro group and a nitroso group and in which at least one of said oxide of nitrogen groups is a nitroso group.

5. 1,2-dinitroso perfluoroethane.
6. 1,2-dinitroso trifluorochloroethane.
7. 1,2-dinitroso perfluoropropane.
8. 1,2-nitronitroso perfluoropropane.
9. 1,2-nitronitroso perfluorobutane.
10. A compound having the general formula

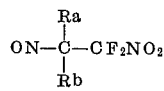

where Ra and Rb are selected from the class consisting of fluorine, chlorine, hydrogen and alkyl, fluoroalkyl, chloroalkyl and fluorochloroalkyl groups having not more than about 5 carbon atoms.

11. A process for producing fluorine-substituted organic adducts which comprises reacting nitric oxide with a halogen-substituted monoolefin containing not more than 12 carbon atoms per molecule and having at least two halogen atoms selected from the group consisting of chlorine and fluorine attached to the doubly bonded carbon atoms at least one of which is a fluorine atom in a mol ratio of at least 1:1 at a temperature between about 10 and about 100° C. and recovering adduct as a product of the process.

12. The process of claim 11 in which the monoolefin is a perhalogenated monoolefin.

13. A process for producing a fluorine-substituted organic adduct which comprises reacting nitric oxide with tetrafluoroethylene in a mol ratio of at least 1:1 at a temperature between about 10 and about 100° C. and recovering adduct as a product of the process.

14. A process for producing a fluorine-substituted organic adduct which comprises reacting nitric oxide with trifluorochloroethylene in a mol ratio of at least 2:1 at a temperature between about 10 and about 100° C. and recovering adduct as a product of the process.

15. A process for producing a fluorine-substituted organic adduct which comprises reacting nitric oxide with perfluoropropene in a mol ratio of at least 2:1 at a temperature between about 10 and about 100° C. and recovering adduct as a product of the process.

16. A process for producing a fluorine-substituted organic compound which comprises reacting nitric oxide with perfluorobutene-1 in a mol ratio of at least 2:1 at a temperature between about 10 and about 100° C.

17. A copolymer in which the recurring units are derived from monomers consisting essentially of a polymerizable ethylenically unsaturated organic compound having not more than 10 carbon atoms per molecule and a compound of the formula:

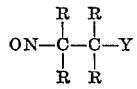

in which R is selected from the group consisting of an alkyl radical of not more than 5 carbon atoms, hydrogen, chlorine and fluorine and at least two R's are halogens at least one of which is fluorine, and in which Y is selected from the group consisting of a nitroso radical and a nitro radical.

18. A copolymer in which the recurring units are derived from monomers consisting essentially of an ethylenically unsaturated olefin having at least two fluorine atoms per molecule and having not more than ten carbon atoms per molecule and a compound of the formula:

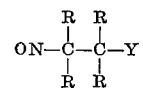

in which R is selected from the group consisting of an alkyl radical of not more than 5 carbon atoms, hydrogen, chlorine and fluorine and at least two R's are halogens at least one of which is fluorine, and in which Y is selected from the group consisting of a nitroso radical and a nitro radical.

19. The copolymer of claim 18 in which the second monomer is a perhalogenated compound.

20. The copolymer of claim 18 in which Y is a nitroso radical.

21. The copolymer of claim 18 in which Y is a nitro radical.

22. A copolymer having the structure of a copolymer in which the recurring units are derived from a polymerizable, ethylenically unsaturated organic compound having at least two fluorine atoms per molecule, and having not more than 10 carbon atoms per molecule, and a compound of the formula

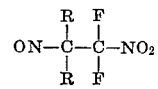

where R is selected from the group consisting of an alkyl radical of not more than 5 carbon atoms, hydrogen, chlorine and fluorine.

23. A copolymer having the structure of a copolymer in which the recurring units are derived from $CF_2=CF_2$ and $ON-CF_2-CF_2-NO_2$.

24. A copolymer of 1,2-dinitroso perfluoroethane and tetrafluoroethylene.

25. A copolymer of 1,2-nitro nitroso perfluoroethane and tetrafluoroethylene.

26. A copolymer of 1,2-nitro nitroso perfluoroethane and unsymmetrical difluorodichloroethylene.

27. A copolymer of 1,2-nitro nitroso perfluoroethane and trifluorochloroethylene.

28. A copolymer of 1,2-nitro nitroso perfluoroethane and trifluoroethylene.

29. A copolymer of 1,2-nitro nitroso perfluoroethane and 2,2,2-trifluoroethylvinyl ether.

30. A copolymer of 1,2-nitro nitroso perfluoroethane and 1,1,2-trifluorobutadiene-1,3.

31. A process for producing a copolymer which comprises copolymerizing an ethylenically unsaturated organic compound having not more than 10 carbon atoms per molecule with a fluorine-substituted organic compound of the formula:

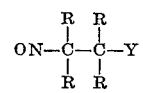

in which R is selected from the group consisting of an alkyl radical of not more than 5 carbon atoms, hydrogen, chlorine and fluorine and at least two R's are halogen at least one of which is fluorine and in which Y is selected from the group consisting of a nitroso radical and nitro radical, at a temperature about —65° and about 100° C.

32. A process for producing a copolymer which comprises copolymerizing a fluorine-substituted ethylenically unsaturated olefin having not more than 10 carbon atoms per molecule with a flourine-substituted organic compound of the formula:

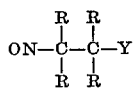

in which R is selected from the group consisting of an alkyl radical of not more than 5 carbon atoms, hydrogen, chlorine and fluorine and at least two R's are olefins at least one of which is fluorine and in which Y is selected from the group consisting of a nitroso radical and a nitro radical.

33. A process for producing a linear copolymer which comprises copolymerizing a fluorine-substituted ethylenically unsaturated olefin having not more than 10 carbon atoms with a fluorine-substituted organic compound of the formula:

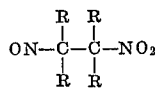

in which R is selected from the group consisting of an alkyl radical of not more than 5 carbon atoms, hydrogen, chlorine and fluorine and at least two R's are halogen at least one of which is fluorine, at a temperature between about −65° and about 150° C.

34. A process for producing a three-dimensional copolymer which comprises copolymerizing a fluorine-substituted ethylenically unsaturated olefin having not more than 10 carbon atoms per molecule with a fluorine-substituted organic compound of the formula:

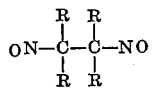

in which R is selected from the group consisting of an alkyl radical of not more than 5 carbon atoms, hydrogen, chlorine and fluorine and at least two R's are halogen at least one of which is fluorine, at a temperature between about −65° and about 150° C.

35. The process of claim 32 in which said olefin is a fluorine-containing monoolefin.

36. The process of claim 32 in which said olefin is a fluorine-containing diolefin.

37. The process of claim 31 in which said unsaturated organic compound is a fluorine-containing vinyl ether.

38. The process of claim 31 in which said unsaturated organic compound is a fluorine-containing ester.

39. The process of claim 32 in which said olefin is a non-halogenated ethylenically unsaturated olefin.

40. A process which comprises a copolymerizing 1,2-dinitroso perfluoroethane with tetrafluoroethylene at a temperature between about −65° and about 150° C.

41. A process which comprises copolymerizing 1,2-nitro nitroso perfluoroethane with unsymmetrical difluorodichloroethylene at a temperature between about −65° and about 150° C.

42. A process which comprises copolymerizing 1,2-nitro nitroso perfluoroethane with trifluorochloroethylene at a temperature between about −65° and about 150° C.

43. A process which comprises copolymerizing 1,2-nitro nitroso perfluoroethane with 2,2,2-trifluoroethylvinyl ether at a temperature between about −65° and about 150° C.

44. A process which comprises copolymerizing 1,2-nitro nitroso perfluoroethane with 1,1,2-trifluorobutadiene at a temperature between about −65° and about 150° C.

45. A process for cross-linking which comprises reacting at a temperature about 150° F. a cross-linking agent selected from the group consisting of a dimercaptan and an amine with a copolymer of a fluorine-containing ethylenically unsaturated olefin having not more than 10 carbon atoms per molecule and a compound of the formula:

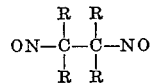

in which R is selected from the group consisting of an alkyl radical of not more than 5 carbon atoms, hydrogen, chlorine and fluorine and at least two R's are halogens at least one of which is fluorine.

46. The cross-linked product of claim 45.

References Cited

UNITED STATES PATENTS

| | | | |
|---|---|---|---|
| 2,485,277 | 10/1949 | Gilbert | 260—93.5 |
| 2,867,669 | 1/1959 | Burkhard et al. | 260—644 |

FOREIGN PATENTS

| | | |
|---|---|---|
| 1,159,935 | 2/1958 | France. |

OTHER REFERENCES

Wall et al., Journal of Research of the National Bureau of Standards, 56 (No. 1), January 1956, pp. 27–34 (Copy in Scientific Library).

Barr et al., Journal of the Chemical Society (London), pp. 1881–89, April 1955 (Copy in Scientific Library).

JOSEPH L. SCHOFER, *Primary Examiner.*

HARRY WONG, JR., *Assistant Examiner.*

U.S. Cl. X.R.

117—132, 124; 260—644, 647, 94.2, 29.6, 92.1, 92.3, 80, 89.5, 88.7, 93.5, 79.3, 79.5, 32.4, 33.8